(12) United States Patent
Chockalingam et al.

(10) Patent No.: US 9,311,330 B1
(45) Date of Patent: Apr. 12, 2016

(54) METHOD AND SYSTEM FOR PERFORMING FULL BACKUP IN A FAILOVER CLUSTER

(71) Applicant: EMC CORPORATION, Hopkinton, MA (US)

(72) Inventors: Elango Chockalingam, Bangalore (IN); Aditya Kapoor, Bangalore (IN); Krishnendu Bagchi, Bangalore (IN); Nikhil Ambastha, Bangalore (IN); Anupam Chakraborty, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 206 days.

(21) Appl. No.: 13/631,723

(22) Filed: Sep. 28, 2012

(51) Int. Cl.
*G06F 7/00* (2006.01)
*G06F 17/30* (2006.01)

(52) U.S. Cl.
CPC ................................. *G06F 17/30212* (2013.01)

(58) Field of Classification Search
CPC .................................................. G06F 17/30212
USPC .......................................................... 707/674
See application file for complete search history.

(56) References Cited

U.S. PATENT DOCUMENTS

| 7,415,585 | B1 * | 8/2008 | Rossi | 711/162 |
| 2002/0188711 | A1 * | 12/2002 | Meyer et al. | 709/223 |
| 2012/0150815 | A1 * | 6/2012 | Pafumi et al. | 707/679 |

* cited by examiner

*Primary Examiner* — Ajith Jacob
(74) *Attorney, Agent, or Firm* — Staniford Tomita LLP

(57) ABSTRACT

This disclosure relates to a method, article of manufacture, and apparatus of performing backup in a failover cluster. In some embodiments, this includes determining whether a repository is part of a failover cluster, based on a determination that the repository is part of the failover cluster, analyzing a role associated with the repository, upon a determination that the role indicates the repository is a failover candidate within the failover cluster, triggering a secondary backup of the repository, and upon a determination that the role indicates the repository is a primary repository within the failover cluster, triggering a primary backup of the repository.

12 Claims, 3 Drawing Sheets

METHOD AND SYSTEM FOR PERFORMING FULL BACKUP IN A FAILOVER CLUSTER

FIELD

The present invention relates generally to storage systems and specifically to systems and methods of backing up data in storage systems.

BACKGROUND

The need for business continuance and fast data recovery is acute and well known. In order to provide consistent and high performance customer support, businesses often deploy multiple data protection techniques to minimize system downtime and to ensure critical data is readily available for fast recovery. System downtime may be planned or unplanned. Many systems in existence today provide fault tolerant and/or high availability of systems to improve customer experience. For example, some systems today may include failover clustering in order to provide high availability during system downtime. A failover cluster may include a primary repository and at least one replica of the primary repository as secondary repository, which may provide certain degree of redundancy. In case of system plan or unplanned downtime, a secondary repository may seamless take over the role of the primary repository, and thereby continue serving customers without significant interruption.

In conjunction with failover clustering, other comprehensive replication techniques may be used to back up data and ensure backup data is readily available for fast recovery. Various replication techniques in existence today involve making copies of the data stored in a primary repository and then tracking changes to the data. For example, one backup technique may involve taking a full backup of the primary repository, followed by taking one or more partial backups, such as incremental or differential backups.

The challenge of using multiple data protection techniques is the seamless integration of various systems. For example, for data protection purpose, certain types of full backup may not be allowed to perform on replicas in a failover cluster. However, after a secondary repository takes over the role of the primary repository, performing full backups on the replica may be necessary. From a user's perspective, just like a system should provide seamless transition during a failover, a transparent and continuous backup should also be in place to ensure business continuation and fast recovery.

There is a need, therefore, for an improved method or system that provides seamless and transparent backup of failover clustering.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
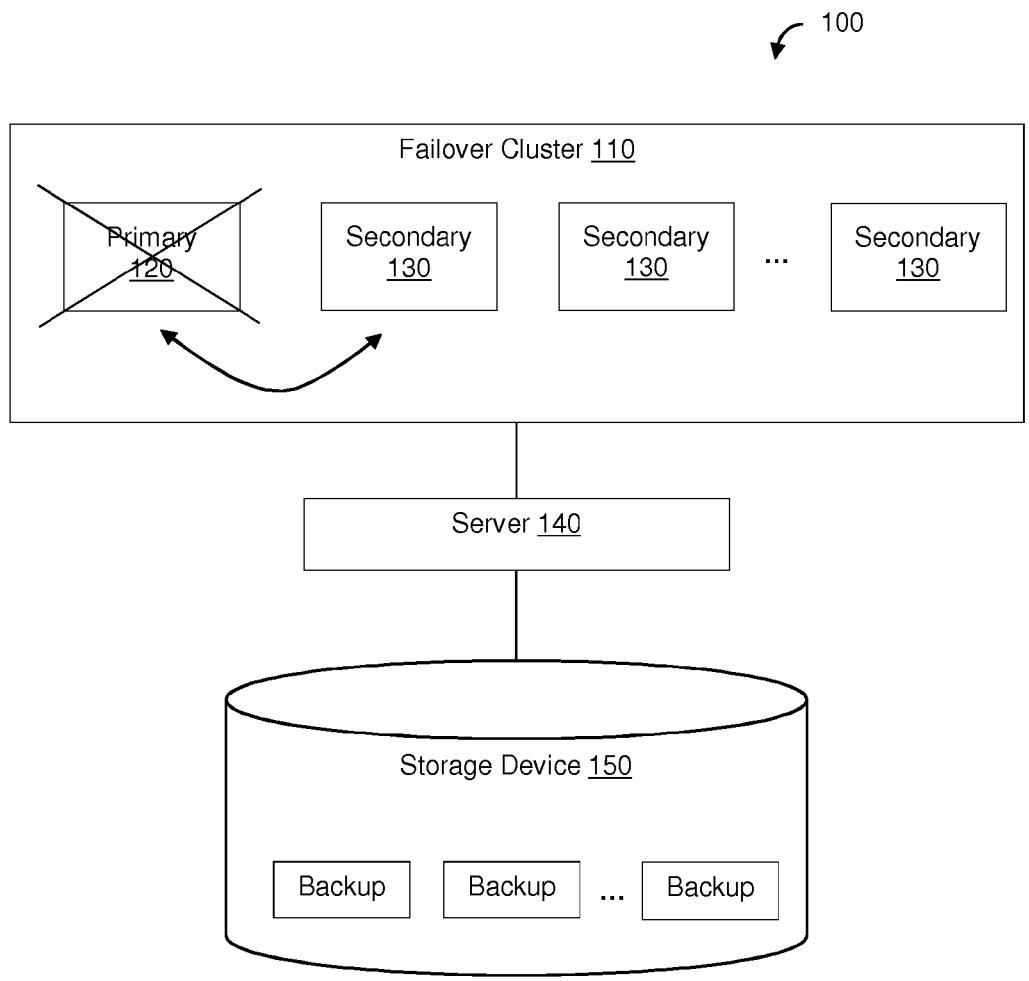
FIG. 1 is a diagram of a storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data storage system, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are methods and systems that provide seamless and transparent backup of failover clustering. FIG. 1 is a system architecture illustrating one embodiment of a data storage system. Storage System 100 includes Failover Cluster 110, Server 140, and Storage Device 150. Server 140 may be a data storage server that stores backup data on Storage Device 150 and transfers backup data to data sources when necessary. Data sources may come from nodes within Failover Cluster 110. Storage Device 150 may store one or more full backups and one or more partial backups. Initially, Server 140 may perform a full backup, in which all data are copied as backup data. The full backup may then be followed by partial backups, such as incremental or differential backups.

In certain embodiments, the system of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, Server 140 of FIG. 1 may provide hosts and clients backup services in a network cloud.

Failover Cluster 110 may include one or more repositories. One repository may be associated with a role indicating as Primary 120. One or more repositories may each be associated with a role indicating as Secondary 130. Primary 120 may provide data during normal operation. Secondary 130 may provide some redundancy to Primary 120. During a failover, Secondary 130 may take over the role of Primary 120 and provide data in order to maintain business continuance.

Failover may be caused by unplanned or planned events. During a failover, the role associated with Primary 120 and Secondary 130 may be changed. For example, when Primary 120 is not available due to system failure, an automatic failover may be configured so that Secondary 130 may seamlessly take over the role of Primary 120. In some other cases, due to planned maintenance or upgrades, Primary 120 may need to be taken offline, and a manual failover may be initiated by an administrator to change the role of Secondary 130 so that Secondary 130 may take over the role of Primary 120. After the maintenance or upgrades, Primary 120 may be brought back online. However, the role associated with Primary 120 may be assigned as secondary for a period of time to avoid service interruption.

In some embodiments, Failover Cluster 110 may be in communication with Server 140 using a dedicated communication link, one or more networks, a local area network, a wide area network, a storage area network, the Internet, a wired network, and/or wireless network, among others. Similarly, other communication links connecting Failover Cluster 110, Server 140, and Storage Device 150 may be a dedicated communication link, one or more networks, a local area network, a wide area network, a storage area network, the Internet, a wired network, and/or wireless network, among others.

Storage Device 150 may represent a non-transitory storage system facilitating storage and retrieval of a collection of data by other systems. Though FIG. 1 illustrates one Server 140 and one Storage Device 150, Storage System 100 may include a plurality of Servers 140 storing backup data on a plurality of Storage Devices 150 and transferring backup data to repositories within Failover Cluster 110 when necessary. Further, Server 140 may be connected to multiple storage devices through different connectors and over various types of connections.

One Storage Device 150 in turn may include one or more disks, each containing a different portion of data stored on Storage Device 150. The storage space in Storage Device 150 may also be apportioned pursuant to a file system, or may be logical or virtual (i.e. not corresponding to underlying physical storage) or may be subdivided into a plurality of volumes or logical devices. The logical devices may or may not correspond to the physical storage space of the disks. Thus, for example, a physical storage device may contain a plurality of logical devices or, alternatively, a single logical device could span across multiple physical devices. Server 120 may be configured to access any combination of logical devices independent of the actual correspondence between the logical devices and the physical devices. Storage Device 150 may be provided as a stand-alone device coupled relatively directly to Server 140 or, alternatively, Storage Device 150 may be part of a storage area network (SAN) that includes a plurality of other storage devices as well as routers, network connections, etc. The system described herein may be implemented using software, hardware, and/or a combination of software and hardware where software may be stored in an appropriate storage medium and executed by one or more processors.

Though FIG. 1 illustrates only one server, Storage System 100 may include multiple servers. These servers need not be physical. These servers may be virtual servers residing in a physical server, or may be a single virtual server residing across multiple physical servers. In some embodiments, different servers may be responsible for different tasks. For example, in Failover Cluster 110, a repository may be a database. Each repository may be associated with a database server instance. Each database server instance may reside on a node. The node may be physical or virtual, or reside across multiple physical servers.

In addition to database servers, a backup server may be responsible for performing full and partial backups, such as incremental or differential backup. During an incremental backup, all transactions since a previous incremental backup may be obtained from the database server and recorded as transaction logs by the backup server. The transaction logs may then be stored on Storage Device 130. During a restore, the transaction logs and the full backups may be located and retrieved from Storage Device 130 by the backup server. And the located full and incremental backups may then be sent to the database server in order to restore the data to a restore point-in-time.

In some embodiments, an intermediary may be used to connect the backup server and the database server. For example, Networker Server, a product available from EMC Corporation, uses Virtual Backup Device Interface (VDI), a product available from Microsoft Corporation, to communicate with SQL Server, also a product available from Microsoft Corporation. Through VDI, backups and restores may be performed by Networker Server on data stored by SQL Server. SQL Server may keep all transactions. During an incremental backup, through VDI, Networker Server may request all transaction from SQL Server since a previous incremental backup. The transactions may be stored on Storage Device 150 as incremental backups. During a restore, Networker Server may locate full and incremental backups stored on Storage Device 150, and communicate through VDI in order to restore data on SQL Server to a point-in-time.

When backing up data in Failover Cluster 110, backup operations may put significant strain on system resources such as I/O, CPU, and memory etc. Offloading backups to a synchronized or synchronizing secondary repository allows users to use the resources on server instance associated with the primary repository for tier-1 workloads. To conserve resources and for data protection purpose, only certain types of backups may be allowed to perform on secondary repository. When a failover occurs, whether planned or unplanned, the role of secondary and/or primary repository may change. From a user perspective, uninterrupted backup should be conducted without manual intervention. The present invention in accordance with some embodiments may seamless and transparently detect the role change of a repository in a failover cluster in order to conduct the appropriate type of backup.

Figure 2:
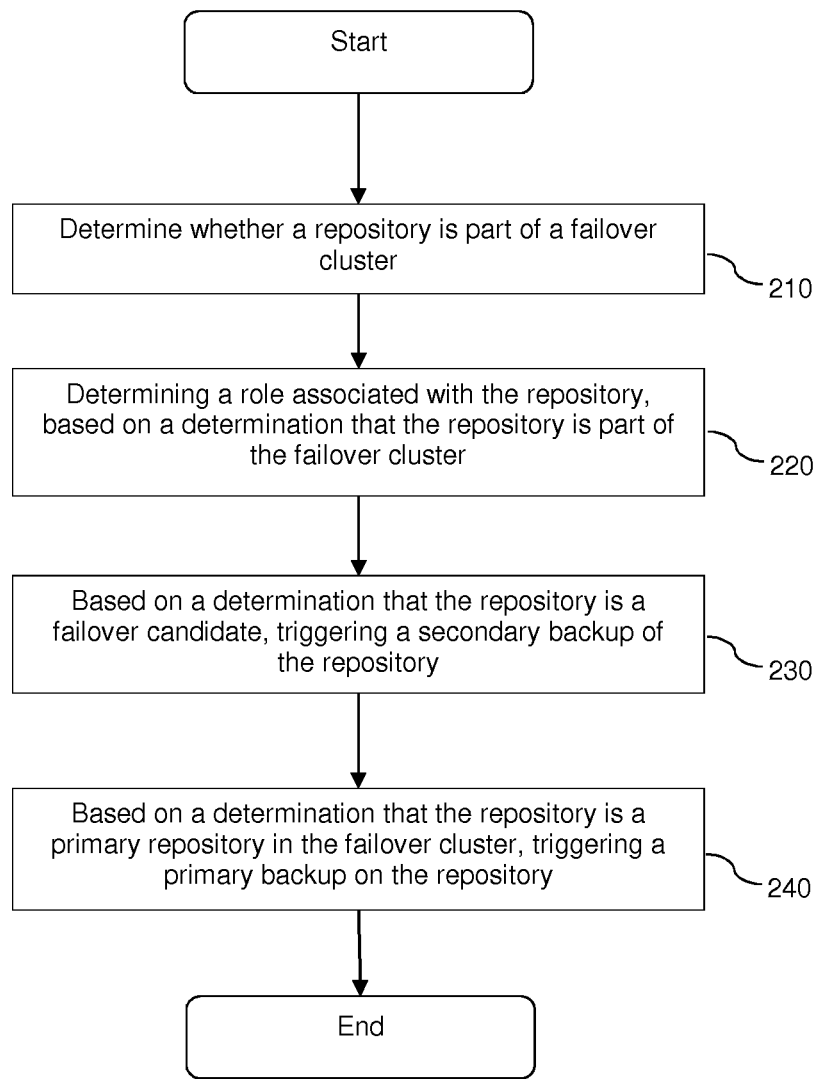
FIG. 2 is a flowchart of method for backing up a repository within a failover cluster in accordance with some embodiments.

FIG. 2 is a flowchart of method for backing up a repository within a failover cluster in accordance with some embodiments. After receiving a backup request, in step 210, Server 140 may determine whether a repository is part of a failover cluster. Other checks of the repository may also be performed in step 210. For example, when a repository is a database, the database type and recovery model, among others, may also be obtained and analyzed. If the repository is part of a failover cluster, the role associated with the repository may be obtained and analyzed in step 220. One repository in a failover cluster may have a role indicating the repository is a primary repository. Some other repository in the failover cluster may have a role indicating the repository is a failover candidate, such as a secondary repository. Based on a determination that the repository is a failover candidate, a secondary backup of the repository may be triggered, in step 230. On the other hand, based on a determination that the repository is a primary repository in the failover cluster, a primary backup of the repository may be triggered, in step 240.

In some embodiments, the repository may be a database. The secondary backup of the repository may be a copy-only full backup. The primary backup of the repository may be a full backup. For example, in case the database is part of SQL Server 2012 AlwaysOn Availability Group, a product available from Microsoft Corporation, only copy-only full backups of databases, files, or filegroups are supported on secondary replicas. Only supporting copy-only full backups on secondary replicas may save system resources, since copy-only backups do not impact the log chain or clear the differential bitmap.

Figure 3:
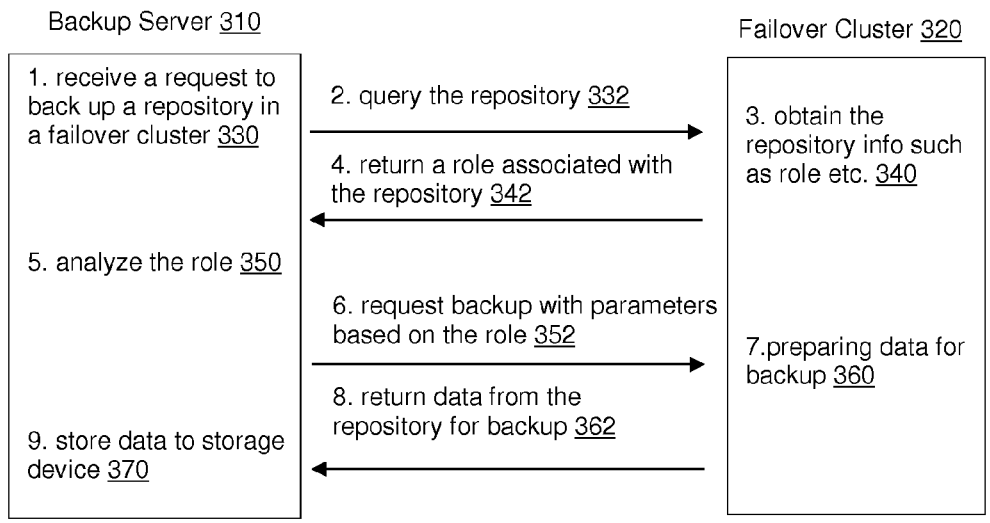
FIG. 3 is a diagram of the interaction between a backup server and a failover cluster during a backup in accordance with some embodiments.

In accordance with some embodiments, FIG. 3 is a diagram of the interaction between a backup server and a failover cluster. The interactions illustrates that the present invention may seamlessly and transparently detect the role change of a repository in a failover cluster and conduct the appropriate type of backup. In step 330, Backup Server 310 may receive a request to back up a repository in a failover cluster. In step 332, one or more queries may be sent to Failover Cluster 320 to obtain repository information. In step 340, upon receiving the one or more queries, the repository information such as role, the type, model and status of the repository may be obtained. The role associated the repository may then be returned to Backup Server 310, in step 342. In step 350, the role may be analyzed by Backup Server 310.

One repository in Failover Cluster may have a role indicating the repository is a primary repository. Some other repository in the failover cluster may have a role indicating the repository is a failover candidate, such as a secondary repository. Based on a determination that the repository is a failover candidate, a secondary backup request along with parameters such as the repository identifier, name, and backup requirements may be sent to Failover Cluster 320, in step 352. On the other hand, based on a determination that the repository is a primary repository in Failover Cluster 320, a primary backup request along with parameters such as the repository identifier, name, and backup requirements may be sent to Failover Cluster 320, in step 352. In response to the request, data may be located in the repository and prepared for backup, in step 360. In step 362, the data from the repository may be returned to Backup Server 310 for backup. The data received by Backup Server 310 may be stored to storage device, in step 370.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for providing backups of a failover cluster, the method comprising:
    determining that a repository is part of the failover cluster, wherein the failover cluster includes a primary repository and at least one failover candidate as a replica of the primary repository;
    based on a determination that the repository is part of the failover cluster, analyzing a first role associated with the repository from repository information stored on the failover cluster, wherein the first role of the repository is either a failover candidate or a primary repository;
    detecting a role change of the repository from the first role to a second role, wherein the second role is one of the failover candidate or the primary repository and different from the first role so that an appropriate type of backup may be performed;
    based upon the analysis that the role of the repository is changed to the failover candidate within the failover cluster, triggering a secondary backup of the repository; and
    based upon the analysis that the role of the repository is changed to the primary repository within the failover cluster, triggering a primary backup of the repository.

2. The method as recited in claim 1, wherein the failover cluster includes a first repository with the first role indicating the first repository as a primary repository and one or more second repositories, wherein for each of the second repositories, the second role indicates each of the one or more second repositories as a failover candidate.

3. The method as recited in claim 2, wherein during a failover, the second role is updated to indicate that the one or more second repositories associated with the second role has become the primary repository.

4. The method as recited in claim 1, wherein the failover cluster includes a plurality of nodes, wherein each of the plurality of node is associated with a database server instance.

5. The method as recited in claim 1, wherein analyzing the changed role associated with the repository includes querying the repository to retrieve the role associated with the repository.

6. The method as recited in claim 1, wherein determining whether the repository is part of the failover cluster is performed in response to a backup request, wherein the backup request conforms to the appropriate type of backup based on the role change.

7. The method as recited in claim 6, wherein the backup request is received by a backup server.

8. The method as recited in claim 7, wherein the backup server is connected to a database server associated with the failover cluster through an intermediary.

9. The method as recited in claim 1, wherein the primary backup is a full backup.

10. The method as recited in claim 1, wherein the secondary backup is a copy-only full backup.

11. A storage system for providing backups of a failover cluster, the system comprising: a processor configured to
   determine that a repository is part of the failover cluster, wherein the failover cluster includes a primary repository and at least one failover candidate as replica of the primary repository,
   based on the determination that the repository is part of the failover cluster, analyzing a first role associated with the repository from repository information stored on the failover cluster, wherein the first role of the repository is either a failover candidate or a primary repository;
   detecting a role change of the repository from the first role to a second role, wherein the second role is one of the failover candidate or the primary repository and different from the first role so that an appropriate type of backup may be performed;
   based upon the analysis that the role of the repository is changed to the failover candidate within the failover cluster, triggering a secondary backup of the repository, and
   based upon the analysis that the role of the repository is changed to the primary repository within the failover cluster, triggering a primary backup of the repository.

12. A computer program product comprising a non-transitory computer usable medium having machine readable code embodied therein for providing backups of a failover cluster, the computer program product comprising:
   determining that a repository is part of the failover cluster, wherein the failover cluster includes a primary repository and at least one failover candidate as replica of the primary repository;
   based on a determination that the repository is part of the failover cluster, analyzing a first role associated with the repository from repository information stored on the failover cluster, wherein the first role of the repository is either a failover candidate or a primary repository;
   detecting a role change of the repository from the first role to a second role, wherein the second role is one of the failover candidate or the primary repository and different from the first role so that an appropriate type of backup may be performed;
   based upon the analysis that the role of the repository is changed to the failover candidate within the failover cluster, triggering a secondary backup of the repository; and
   based upon the analysis that the role of the repository is changed to the primary repository within the failover cluster, triggering a primary backup of the repository.

\* \* \* \* \*